US011993900B2

(12) United States Patent
Holodnak

(10) Patent No.: US 11,993,900 B2
(45) Date of Patent: May 28, 2024

(54) MICROWAVE CELL SYSTEM AND METHOD FOR ASPHALT TREATMENT

(71) Applicant: Gary J. Holodnak, Parma Heights, OH (US)

(72) Inventor: Gary J. Holodnak, Parma Heights, OH (US)

(*) Notice: Subject to any disclaimer, the term of this patent is extended or adjusted under 35 U.S.C. 154(b) by 78 days.

(21) Appl. No.: 17/904,349

(22) PCT Filed: Feb. 18, 2021

(86) PCT No.: PCT/US2021/018448
§ 371 (c)(1),
(2) Date: Aug. 16, 2022

(87) PCT Pub. No.: WO2021/168029
PCT Pub. Date: Aug. 26, 2021

(65) Prior Publication Data

US 2023/0069672 A1 Mar. 2, 2023

Related U.S. Application Data

(60) Provisional application No. 62/978,041, filed on Feb. 18, 2020.

(51) Int. Cl.
*E01C 7/18* (2006.01)
*H05B 6/68* (2006.01)
(Continued)

(52) U.S. Cl.
CPC ............... *E01C 7/187* (2013.01); *H05B 6/68* (2013.01); *H05B 6/701* (2013.01); *H05B 6/80* (2013.01); *H05B 6/707* (2013.01)

(58) Field of Classification Search
CPC ........... E01C 7/187; H05B 6/68; H05B 6/701; H05B 6/707; H05B 6/80
(Continued)

(56) References Cited

U.S. PATENT DOCUMENTS 3,725,627 A * 4/1973 Arai ........................ H05B 6/707 219/746
4,175,885 A * 11/1979 Jeppson ................ E01D 19/083 404/31
(Continued)

FOREIGN PATENT DOCUMENTS

WO 2019193493 A1 10/2019

OTHER PUBLICATIONS

International Search Report and Written Opinion for PCT/US21/18448 issued May 6, 2021, 10 pages.

*Primary Examiner* — Raymond W Addie
(74) *Attorney, Agent, or Firm* — Vorys, Sater, Seymour and Pease LLP; Mark A. Watkins

(57) ABSTRACT

The present disclosure describes systems and methods that employ a plurality of microwave applicator cells as a combined unit to continuously travel along an asphalt surface to treat the existing asphalt with microwave energy. The microwave treatment reanimates the existing (and likely damaged) asphalt to a workable state that is almost identical in nature to newly laid asphalt. The microwave system is configurable to span the width of a standard road lane, wherein the continuously traveling system efficiently repairs damaged roads with minimal down time.

23 Claims, 11 Drawing Sheets

(51) Int. Cl.
*H05B 6/70* (2006.01)
*H05B 6/80* (2006.01)

(58) Field of Classification Search
USPC .......................................... 404/75, 77, 79, 95
See application file for complete search history.

(56) References Cited

U.S. PATENT DOCUMENTS

| | | | | | |
|---|---|---|---|---|---|
| 4,252,459 | A | | 2/1981 | Jeppson | |
| 4,347,016 | A | * | 8/1982 | Sindelar | E01C 23/065 126/271.2 A |
| 4,571,860 | A | * | 2/1986 | Long | E01C 7/32 34/259 |
| 4,619,550 | A | * | 10/1986 | Jeppson | E01C 19/1004 404/81 |
| 4,765,773 | A | * | 8/1988 | Hopkins | E01C 23/081 34/259 |
| 5,092,706 | A | * | 3/1992 | Bowen | E01C 23/06 404/31 |
| 6,401,637 | B1 | * | 6/2002 | Haller | A01M 1/226 111/118 |
| 8,845,234 | B2 | | 9/2014 | Hegg | |
| 2002/0150425 | A1 | * | 10/2002 | Bodish | E02D 3/026 404/95 |
| 2006/0078383 | A1 | * | 4/2006 | Novak | F26B 19/005 404/95 |
| 2006/0198699 | A1 | * | 9/2006 | Hall | E01C 23/14 404/95 |
| 2010/0322713 | A1 | | 12/2010 | Hegg et al. | |
| 2011/0120991 | A1 | | 5/2011 | Pitsakis | |
| 2015/0233067 | A1 | * | 8/2015 | Coe | E01C 19/002 404/77 |

* cited by examiner

| Asphalt Dielectric Loss | Absorbed Power (W) |
|---|---|
| 0.2 | 5954.4 |
| 1 | 6670.6 |
| 5 | 6837.8 |

MICROWAVE CELL SYSTEM AND METHOD FOR ASPHALT TREATMENT

CROSS-REFERENCE TO RELATED APPLICATION

This application claims priority benefit of U.S. provisional Patent Application Ser. No. 62/978,041, filed Feb. 18, 2020, entitled "MICROWAVE CELL SYSTEM AND METHOD FOR ASPHALT TREATMENT," the complete disclosure of which is herein incorporated by reference in its entirety. This application is a National Stage of International Application No. PCT/US2021/018448, filed Feb. 18, 2021, which is incorporated by reference herein in its entirety.

FIELD

The present disclosure relates to systems and methods for microwave treatment and reconditioning of roadway surfaces, for example, asphalt concrete surfaces. More particularly, it relates to the use of an array of individual microwave cells for heating and treating a width of roadway surface while continuously traversing the roadway. The microwave cells may be arranged in a tiled array and travel as a unit at a constant speed along a treatment surface. The microwave treatment reanimates the existing (and likely damaged) asphalt to a workable state that is almost identical in nature to newly laid asphalt. It is to be appreciated that the present exemplary embodiments are also amenable to other like applications.

BACKGROUND

Deterioration of asphalt concrete is a nationwide problem, which often necessitates premature replacement of road pavement surfaces. Asphalt concrete is a commonly used composite material to surface roads, parking lots, airports and the like. It consists of mineral aggregate (sand, stones) bound together with asphalt concrete, which is laid in layers and compacted. The performance of asphalt concrete decreases over time as it is subject to deterioration including, but not limited to, cracking, potholes, upheaval, raveling, bleeding, rutting, shoving, stripping, and grade depression.

Factors that contribute to asphalt concrete deterioration include construction quality, environment, and traffic loads. For example, moisture damage in asphalt concrete contributes to adhesion failure between the concrete and the aggregate as well as cohesion failure within the asphalt concrete itself. Adhesion failure occurs when moisture accumulates between the asphalt and concrete and lifts the asphalt film away. The cohesion failure occurs when moisture causes a reduction in cohesion within the asphalt cement, reducing integrity and strength.

Repair of an asphalt concrete surface generally consists of filling cracks, surface imperfections, and potholes with an asphalt mix and other surface treatments, e.g., filling with a bituminous crack sealer. These repairs do not possess the same durability of the original pavement and will likely need to be repeated over time until the entire road is repaved. When the deterioration of the roadway necessitates replacement, conventional methods for repaving a road is costly. This is because repavement involves fleets of different heavy machinery. To repave a road, such as a highway or a city street, the road/lane(s) needs to be blocked off and the damaged road surface will need to be removed, requiring a large crew of workers and specialized machinery. The remaining surface is cleaned, and all the removed material is hauled away by large dump trucks. Another set of machines are brought in, to the road site for transporting in and laying down new asphalt.

In some prior treatment methods, asphalt may be reused by combining the removed material with new bitumen. The reused asphalt is used primarily a filler material and may be deteriorated by traditional heating and processing methods. Thus, the durability of roads using reused asphalt is generally known to be poor.

Microwave energy can be used to treat and condition asphalt concrete. Microwave energy is a flameless heat source that internally heats an application area to a certain penetration depth. That is, heating by microwave energy does not rely on conduction of heat inward from the surface; rather, heat is generated within a targeted volume of material. Heat transfer by conduction may take place after the target volume is heated. This application of heat is significant because a desired uniform temperature of material may be reached without overheating any portion thereof.

U.S. Pat. No. 8,845,234, (the '234 Patent) entitled "Microwave Ground, Road, Water, and Waste Treatment Systems" (the disclosure of which is herein incorporated by reference) teaches a microwave ground or road heating system for the treatment and repair of roadways. In one embodiment, the treatment system includes a single microwave generator that produces long wavelength microwaves at 915 MHz. The system of the '234 Patent is connected to a boom such that a microwave waveguide may be moved and placed to direct microwaves to a limited desired location on the ground. This design suffers from drawbacks in that the system of the '234 Patent can only be used to repair small areas in a time-consuming process. The repair of the '234 Patent would make the cost of repair prohibitive when a cold patch repair would be quicker and less expensive. Municipalities and townships would, therefore, be reluctant to pay for a repair according to the '234 patent, costing about 20 times more than a scoop of cold patch and by a process that would take about 20 times longer, even though the microwaved repair would last much longer. Furthermore, microwave radiation is directed energy, with little scattering or dispersion. For example, microwave ovens usually include a mode stirrer device used to modify the electromagnetic field within a microwave oven to spread out the microwave energy and improve the uniformity of heating. Thus, a single magnetron and waveguide would have difficulties in applying a significant amount of microwave energy to a large area, e.g., the width of a road. Lastly, the equipment required for the longer wavelength microwaves is considerably large with corresponding large power requirements.

The present disclosure provides certain improvements including, but not limited to, selective treatment across a width of a road to achieve continuous heating while in continuous motion and cost-effective quality road repair. While exemplary embodiments described herein relate to use of microwave applicator cell arrays on a road surface, it is to be appreciated that any asphalt surface may be treated in a similar continuously traveling manner. That is, the exemplary systems and methods may also be used to repair parking lots, paths (e.g., asphalt trails and golf cart paths), driveways, etc.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Described herein are devices, systems and methods that employ an array of microwave applicator cells cooperatively connected a trailer or truck. The array of microwave cells continuously travel and apply microwave energy along a road surface as a unit. The treatment returns the surface back to "as original" without removing or modifying (i.e., breaking up or otherwise manipulating) the roadbed. The array systems described herein are generally configurable to span the width of a standard road lane for increased efficiency for repairing asphalt surfaces. The systems and methods may also have several additional components or sub systems to support repair and operation as described in detail below. These additional components and subsystems include, for example and without limitation, sensors, fluid sprayers, mechanical scarfers, lidar and GPS location.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
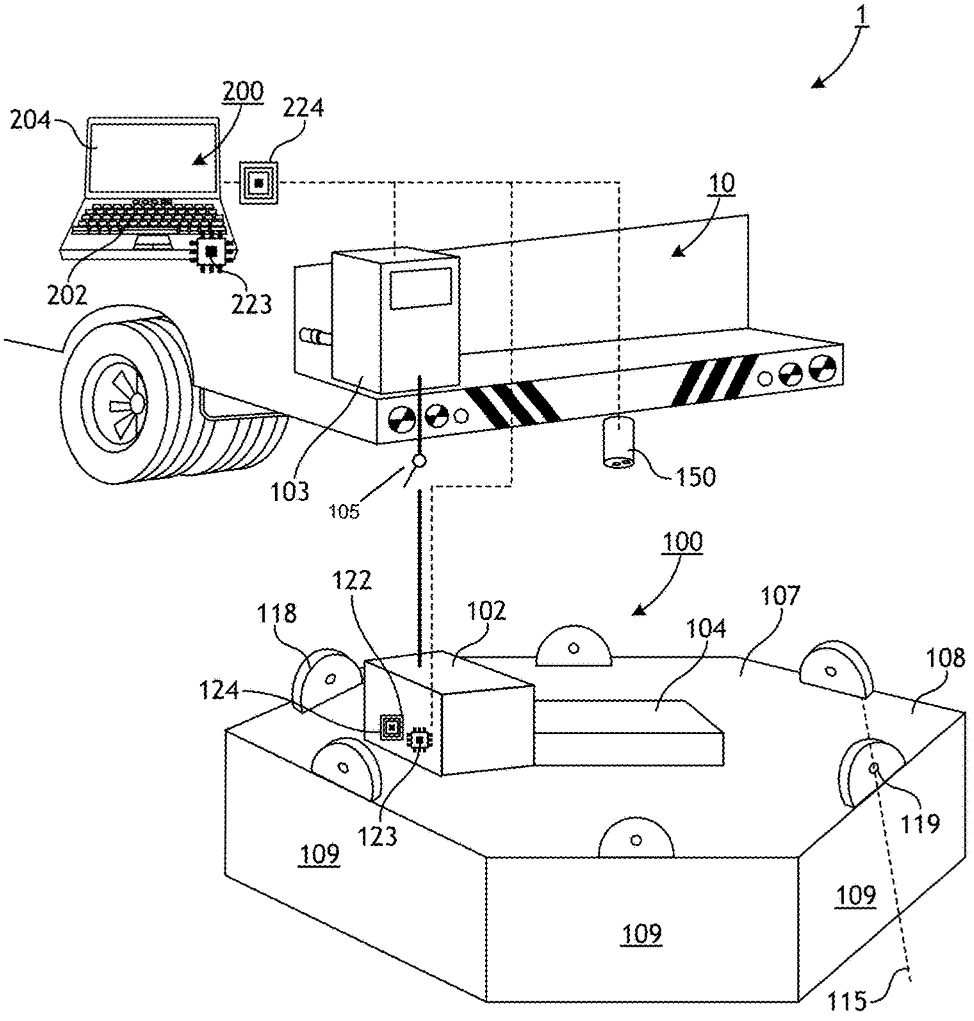
FIG. 1 is an exemplary microwave system and microwave cell in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are therefore, not intended to indicate relative size and dimensions of the devices or components thereof and/or to define or limit the scope of the exemplary embodiments.

As used herein, "microwaves" are a form of electromagnetic radiation with wavelengths ranging from about one (1) meter to one (1) millimeter; with frequencies between about 300 MHz and 300 GHz. Use of industrial, scientific and medical (ISM) radio bands including microwaves, is governed by the United States of America, through the FCC. Currently, the two frequencies of 915 MHz and 2.45 GHz are the assigned frequencies for industrial applications of microwave energy. However, it is to be appreciated that other frequencies may be used in accordance with the present disclosure without deviating from the scope thereof.

Microwaves are generated by magnetrons, which are generally commercially available in one of two configurations. First, are the relatively small and inexpensive magnetrons that are readily available and commonly used in household microwave ovens, these generate microwaves of 2.45 GHz. Second, are large and relatively expensive magnetrons, e.g., weighing over 200 lbs. The microwave treatment system of the aforementioned mentioned U.S. Pat. No. 8,845,234 uses such a large magnetron, which takes up significant space in the back of a vehicle. These large magnetrons not only require significant space but also an equally large power source to power the magneton. These generally are configured to generate long wavelengths and frequencies of 915 MHz.

As mentioned briefly above, reusing asphalt for road surfaces results in a road with poor durability. The reused asphalt is used as a filler material. That is, the reclaimed material is heated up and combined with new bitumen material for application to a road surface. When the reused asphalt is re-heated by conventional methods, the heat deteriorates the reused material. This may potentially be due to the uneven application of extreme heat, as conventional methods drive heat into the asphalt itself from the outside of the material to the interior of the material. This is different from microwave application which can heat all portions of the material (interior and exterior) alike.

Applicants have found that the application of microwaves to an asphalt surface "reanimates" existing asphalt to a workable state that is almost identical in nature to newly laid asphalt. That is, the reanimated asphalt exhibits flow and slump similar to freshly created asphalt mixtures. More surprisingly, this workable state may be achieved by using a plurality of small magnetrons, similar to those used in home microwave ovens, operating at about 2.45 GHz. The microwave treatment allows the previously damaged asphalt to self-heal (flow) or be further processed by rollers in repairing and reconditioning a damaged road surface. A microwave treatment system as described herein may replace all the machinery and crew needed to tear up an existing road, haul away the old material, bring in new material, and apply the new material to the road surface. The downtime of a blocked off road is significantly shortened as all that is needed is for a microwave application system to continuously travel down a road and reanimate the damaged asphalt. That is, the systems and methods described herein are able to continuously travel along a distance while it is treating the surface it traverses allowing for efficient reanimation and processing of a damaged road surface.

Exemplary embodiments of the present disclosure relate to microwave application systems and microwave applicator cells for applying microwave energy to a surface. In some embodiments, a plurality of microwave applicator cells are tiled in rows and columns (an array) that span across a desired width, e.g., the width of one standard road lane. Multiple adjacent rows of microwave applicator cells, lined along a length, define a total microwave array length. A vehicle, operatively coupled to the array microwave applicator cells, is configured to travel along a treatment surface at a continuous speed while applying microwaves to the surface.

FIG. 1 illustrates an exemplary microwave application/treatment system 1, with a single representative microwave applicator cell 100. It is to be understood that a plurality of individual microwave applicator cells 100 may be connected together to form a tiled arrangement (e.g. array) for a microwave application system 1. That is, each microwave applicator cell 100 is configured to be tiled into a tessellation-like arrangement, providing for a substantially continuous application area that, in some embodiments, spans a width of about 8-12 feet (the width of a roadway), discussed in greater detail below.

A microwave applicator cell 100 includes at least a microwave generator 102 and an associated waveguide 104, sometimes referred to herein as a microwave generator and waveguide pair. Each microwave generator 102 is powered by a power source 103 and generates electromagnetic radiation in the form of microwaves. It is to be understood that the microwave application system 100 may have a single power source 103 that supplies electrical power to all of the microwave generators 102 in the system 1 as well as other various components described herein. In alternative embodiments, each microwave generator 102 or microwave applicator cell 100 is associated with its own power source 103, i.e., the microwave application system 100 includes multiple power sources 103. Furthermore, while the power source 103 is illustrated as being carried by a truck 10, it is to be understood that the location of a power source 103 is not limiting. That is, the power source may be carried by the truck 10, or may be attached to at least one of the plurality of microwave applicator cells 100.

The microwaves generated by each microwave generator 102 has a wavelength in the range of about 0.001 m to about 1 m. In some embodiments, the microwave generator 102 is configured to generate microwaves having a wavelength of about 0.122 m (a frequency of about 2.45 GHz). The microwave generator 102 may be variously embodied, including but not limited to as vacuum tube device such as a magnetron, klystron, and traveling wave tube, and/or as a solid-state device such as a field-effect transistor, tunnel diodes, and the like.

A waveguide is a structure for guiding electromagnetic waves from one point to another. Here, waveguide 104 directs the microwave radiation from the microwave generator 102 to the interior of the microwave applicator cell 100 and toward the ground. The waveguide 104 has a first end that is operatively connected to the microwave generator 102 such that the waveguide 104 transfers microwaves from the microwave generator 102 to the waveguide 104. The waveguide 104 guides the received microwaves to interior of the applicator body 108 of the microwave applicator cell 100 such that the microwaves are directed towards and allowed to impinge and penetrate a treatment surface (e.g. the surface of a road) bounded by the applicator body 108. In other words, each applicator body 108 defines the boundaries of the treatment surface that receives microwave energy. The width of each waveguide 104 is generally dimensioned to be of the same order of magnitude as wavelength of the microwaves generated by the microwave generator 102 to minimize waveguide losses. For example, the waveguide 104 is preferably sized in increments of about 0.328 m for 915 MHz microwave radiation and in increments of about 0.122 m for 2.45 GHz microwave radiation. In some embodiments, a waveguide 104 is embodied as a hollow, conductive metal tube. The cross-section of the hollow metallic tube is preferably uniform, and transmits the generated electromagnetic waves by successive reflections from the interior walls of the hollow tube (waveguide 104).

In some embodiments, the waveguide 104 further includes a flared end, often referred to as a "horn," used to transmit microwaves from the waveguide 104 out into space (e.g., toward the application surface). The flared horn portion forms a smooth transition between the waveguide 104 and free space.

As briefly mentioned above, the microwave applicator cell 100 also includes an applicator body 108. The applicator body 108 may have a top wall 107 (sometime referred to herein as a "ceiling") and at least one sidewall. In the illustrated embodiment of FIG. 1, the sidewall, is composed of a plurality of connected polygonal perimeter sections 109. The applicator body 108 including the top wall 107 and plurality of polygonal perimeter sidewalls 109 may be composed of, but not limited to, a metal material. In the exemplary embodiment of FIG. 1, each polygonal sidewall section 109 is generally rectangular and is connected to adjacent sidewall sections 109 and top wall 107 to form the applicator body 108. The applicator body 108 may have the shape of a regular polygon, wherein each side length and interior angles between adjacent sidewall sections 109 are the same. While a regular hexagonal polygon having six rectangular sidewall sections 109 perpendicular to a hexagonally shaped top wall 107 is illustrated in FIG. 1, it is to be appreciated that other regular and irregular shapes having a corresponding number of sidewall sections 109 may be substituted therein without deviating from the scope of the present disclosure. For example, the top wall 107 may be shaped as a regular triangle (see FIG. 3), having three rectangular sidewall sections 109 perpendicular thereto. In another non-limiting example, the top wall 107 may be shaped as a quadrilateral (see FIG. 4), having four rectangular sidewall sections 109, connected perpendicularly thereto.

Figure 8:
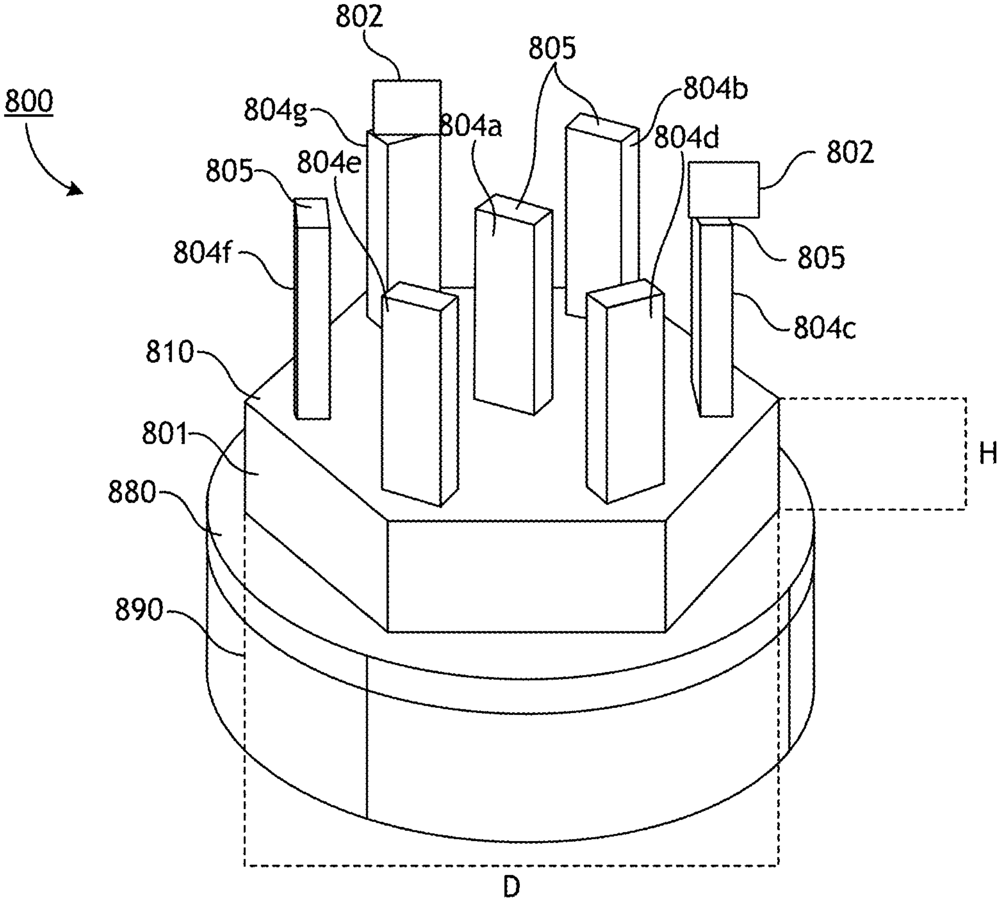
FIG. 8 is an exemplary microwave applicator cell in accordance with the present disclosure.

With reference to FIGS. 1 and 8, the sidewall sections 109 and consequently, the applicator body 108, may have a height H ranging from about 2 inches to about 12 inches, including 2.5, 3, 3.5, 4, 4.5, 5, 5.5, 6, 6.5, 7, 7.5, 8, 8.5, 9, 9.5, 10, 10.5, 11, and 11.5 inches. However, it is to be appreciated that the height of the sidewall and applicator body is not limiting. The height H is generally high enough such that debris on the road surface would not damage the interior components of the cell 100. The height H is also based, in part, on a desired microwave irradiance (power per unit area sometimes called intensity) at the treatment surface. Other considerations for the height H relate to the internal air space and providing enough internal cell volume for the flow and exhaust of gases created during the microwave process. The height H may also be dependent of the material being treated as asphalt composition differs geographically. In yet still further embodiments, each cell 100 may have a variable height H, (e.g., with curtain or telescoping walls) allowing an operator to set the height H before treatment. Further details regarding the height H follows below.

The top wall 107 is further configured to receive and/or mount the microwave generator 102 and waveguide 104 pair, and allow the generated microwaves to travel into the interior of the applicator body 108 and impinge and penetrate a ground surface. The microwave waveguide 104 may attach to the top wall 107 through means known in the art, including fastening and welding. In some embodiments, the microwave generator 102 and waveguide 104 are positioned and configured such that microwaves generated by the microwave generator 102 enter the interior of the applicator body 108 about the center of the top surface 107. It is to be appreciated that while FIG. 1 illustrates a single centered microwave generator 102 and waveguide 104 pair associated with a microwave applicator cell 100, that a microwave applicator cell 100 may be configured to include more than one microwave generator 102 and waveguide 104 pairs. These microwave generator 102 and waveguide 104 pairs may be arranged in a spaced-apart manner such that each microwave generator 102 and waveguide 104 pair directs its microwave energy toward a ground surface. The amount and arrangement of microwave generator 102 and waveguide 104 pairs is at least partially based on an area bounded by the applicator body 108 of the microwave applicator cell 100 and a desired application pattern.

In some embodiments, each microwave applicator cell 100 further includes at least one fastening point 118 used to connect adjacent microwave applicator cells 100 together. In some embodiments, a fastening point 118 is located on the top wall 107 about a centerline 115 of a sidewall section 109, however, the location of the fastening point 118 is not limiting. The fastening point 118 may include an aperture 119 configured to receive a fastener for connecting multiple microwave applicator cells 100 together. A fastener may include, for example and without limitation, a threaded bolt and nut, axes and cotter pin, a chain, a shackle, and the like. In some embodiments, and as illustrated in the exemplary embodiment of FIG. 1, each microwave applicator cell 100 includes a fastening point 118 corresponding to each sidewall 109, allowing for multiple microwave cells 100 to connect to one another. That is, the fastening points 118 and associated fasteners of adjacent microwave applicator cells (see microwave applicator cells 100A-D of FIG. 2) allow for the physical connection of at least two applicator cells, wherein substantially parallel sidewall sections 109 of adjacent microwave applicator cells abut one another, when secured at the fastening point 118. The multiple fastening points 118 allow fora plurality of microwave applicator cells 100 to be connected in a tiled arrangement, allowing for a microwave application system 1 to apply microwaves about a substantially continuous area that is larger than the footprint of a single microwave applicator cell 100. For example, a single microwave applicator cell 100 may have a diameter of about two (2) feet (discussed in greater detail below with respect to FIG. 8), while multiple connected microwave applicator cells (see FIGS. 3-5) may span a width W greater than two (2) feet, preferably greater than about five (5) feet, including eight 8, 9, 10, 11, 12, 13 feet, and all values therebetween.

In some embodiments, operation of a microwave applicator cell 100 is controlled by a power switch 105. That is, the transmission of electrical power to each microwave cell 100 (and microwave generator 102) is controlled by activating power switch 105. When power is directed to each cell 100/microwave generator 102, microwaves are generated and directed toward the treatment surface. Likewise, to power off a microwave cell 100/microwave generator 102, such microwaves are no longer produced, the power switch 105 may be used to cease the power transmission to each microwave cell 100. The power switch 105 may be variously embodied as known in the art. In some embodiments, a single power switch 105 controls the application of power to all the cells 100 of a system. In other embodiments, individual cells 100 or groups of cells 100 are each powered through a separate switch 105. That is, a system of cells 100 may have multiple power switches 105 that direct electrical power to different cells 100 or groups of cells.

Figure 2:
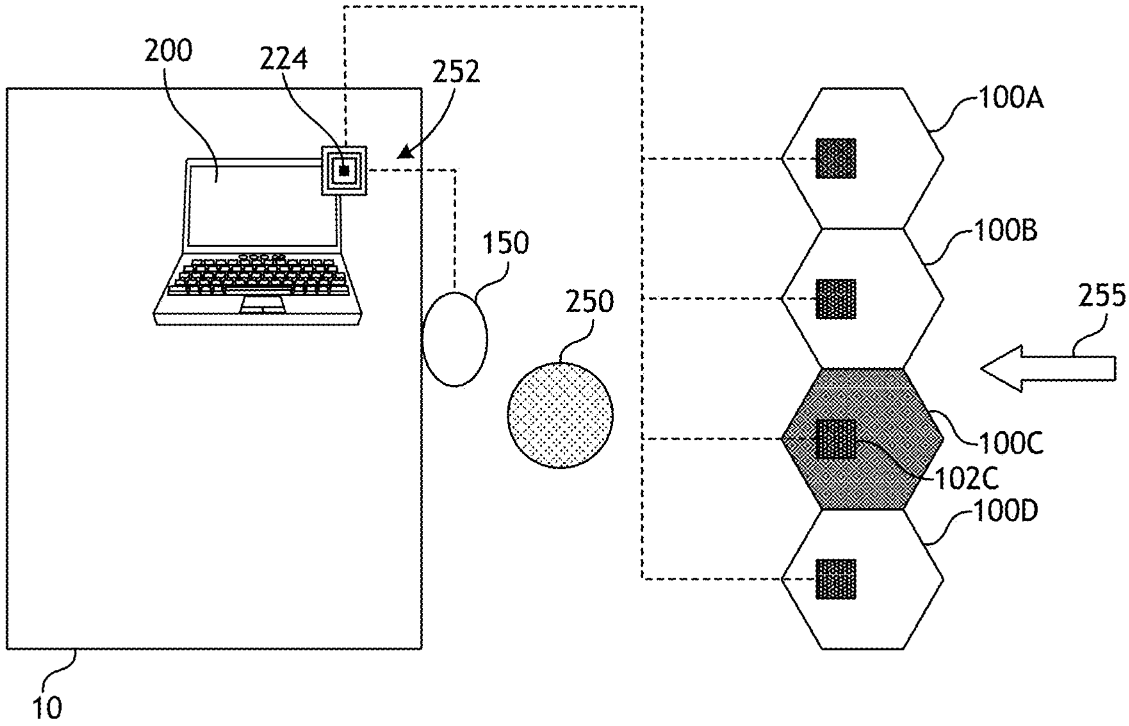
FIG. 2 is an exemplary top schematic view of a plurality of microwave cells controlled by a controller for selective application of microwaves in accordance with the present disclosure.

In some embodiments and with reference to FIGS. 1 and 2, a central computer system 200 may be configured to monitor and control the operation of each microwave applicator cell 100A-D and in some embodiments, each microwave generator 102 associated with each applicator cell 100. That is, the application of microwaves by each microwave applicator cell 100A-D and/or microwave generator 102 is controlled by the central computer system 200. For example and as illustrated in FIG. 1, the central computer system 200 may, for example and without limitation, via communication with a power source 103, control and vary the electric power delivered to the microwave generator 102 such that the generation of microwaves by that microwave generator 102 is controlled. When power is directed to a microwave generator 102, that microwave generator 102 produces microwaves. When power is removed from a microwave generator 102, that particular microwave generator 102 no longer produces microwaves.

The central computer system 200 may be variously embodied as a personal computer (illustrated), tablet, smartphone or other known device that hosts a software platform and/or application. The central computer system 200 may include a processor 223 that may be any of various commercially available processors, such as by a single-core processor, a dual-core processor (or more generally by a multiple-core processor), a digital processor and cooperating math coprocessor, a digital controller, or the like. The central computer system 200 may also include at least one user interface 202 and/or display 204 configured to present data related to the operation of each of the microwave applicator cells 100 to a user. The user interface 202 may also allow a user to input commands into the central computer system 200 for the monitoring and controlling the various components of the microwave application system 1. The central computer system 200 may be located on the vehicle 10 that is configured to transport the array of microwave applicator cells 100A-D. In other embodiments, the central computer system 200 is a remote device capable of operating the plurality of microwave applicator cells 100 from a distance, e.g., the central computer system 200 is a tablet held by an operator on a job site. The software platform hosted on the central computer system 200 may be an Internet of Things (IoT) platform that is available off the shelf, modified, or designed in-house.

It will be appreciated that the central computer system 200 may be connected to a LAN (Local Area Network) and include any hardware, software, or combinations thereof, capable of implementing the systems and methods described herein. Suitable examples of such hardware include, for example and without limitation, processors, hard disk drives, volatile and non-volatile memory, a system bus, user interface components, display components, and the like. It will further be appreciated that multiple such devices may be used as the central computer system 200 accordance with the subject disclosure. The central computer system 200 may also include a computer communication interface 224 for communicating with a plurality of devices including, but not limited to, each of the microwave cells 100, sensors 150, and remote devices.

In some embodiments, each microwave applicator cell 100 includes various hardware components, including, but not limited to, a control circuitry 122 and a communication interface 124, wherein the communication interface 124 is in electronic communication with the control circuitry 122. The control circuitry 122 and communication interface 124 provide for data communication between a microwave applicator cell 100 and the central computer system 200 via computer communication interface 224.

The control circuitry 122 may include a processor 123 that may be any of various commercially available processors. The processor 123 may control various functions of the microwave cell 100, including the generation of microwaves by at least one microwave generator 102 associated with the applicator cell 100. In embodiments where a microwave cell 100 is associated with multiple microwave generators, the processor 123 may individually control the operation of each generator.

The communication interface 124 also includes circuitry for transmitting and receiving data to and from a central computer system 200 via known methods including, but not limited to, wired transmission and wireless transmission e.g., RF transmission, cellular transmission, satellite transmission, etc. In some embodiments, the communication interface 124 may also receive data transmitted from a server or remote user device, such as a tablet. In some embodiments, application software is executed by the control circuitry 122 (processor 123) for performing commands received by the communication interface 124 from the central computer system 200, server, and/or user device. As an illustrative example and with reference to FIGS. 1 and 2, the communication interface 124 of a microwave cell 100 transmits position data to a central computer system 200, including the location of that particular microwave cell 100 with respect to other microwave cells 100 in a tiled arrangement. The central computer system 200 also includes a communication interface 224. The communication interface 224 is configured to individually transmit computer commands to the control circuitry 122 (via communication interface 124) of each microwave cell 100, to selectively control the generation of microwaves by each individual microwave cell 100, i.e., ON/OFF, and as a result, the computer system 200 controls the area of the underlying road that receives microwave treatment.

In some embodiments, the communication interface 124, 224 is a plug-and-play type card or other type of memory card having an associated interface processor and interface memory. The interface processor may execute preprogramed application software stored within the interface memory for receiving position and other data and communicating such data to a central computer system 200. The communication interface 124, 224 may include additionally known hardware, for example, an antenna, RF transmission means, modem, telephone connectors, ethernet connectors, broadband connections, DSL connections, etc. for transmitting and receiving data.

With continued reference to FIGS. 1 and 2, the microwave application system 1 may employ at least one sensor 150 configured to measure a condition of the treatment surface. Conditions include but are not limited the detection of metal objects (e.g., manhole covers), road debris, moisture content, surface roughness, and temperate. The sensor may produce an analog or digital signal that may directly communicate to or alert an operator of the system 1 of a detected surface condition. For example, the sensor may be connected to an analog display that conveys measured states to the operator. The operator may read the display and control the system 1 accordingly.

In some embodiments, the at least one sensor 150 is in communication with the central computer system 200. In some embodiments, the at least one sensor 150 is attached to a vehicle 10 configured to transport the plurality of microwave cells 100. Generally, the at least one sensor 150 is placed directionally in front of the plurality of microwave applicator cells 100. In other embodiments, the at least one sensor 150 is attached to the applicator body 108 of a microwave applicator cell 100. In yet still further embodiments, at least one sensor 150 is attached to a vehicle 10 configured to transport the plurality of microwave applicator cells 100 and at least one sensor 150 is attached to at least one microwave applicator cell 100.

In some embodiments, the at least one sensor 150 is a temperature sensor. In some embodiments the at least one sensor is a microwave bounce back sensor configured to collect data for the control and operation of the plurality of microwave cells 100. The at least one sensor 150 is configured to collect data relating to the state of the surface prior to, during, or after application of microwave energy to a surface, such that the application (presence or intensity) of microwaves or other treatment processes can be adjusted accordingly via computer system 200.

In some embodiments and with particular reference to FIG. 2, the at least one sensor 150 is configured to detect the presence of debris or road structures 250 on the road surface. For example and without limitation, the road structure 250 detected by the at least one sensor 150 may be a metal grating and/or service cover (also known as a manhole cover). The least one sensor 150 may be a magnetic sensor, an optical sensor, image sensor and/or other sensors known in the art that may detect certain road structures 250.

The vehicle 10 is configured to transport the plurality of microwave applicator cells 100A-D in a side-by-side tiled pattern that spans the length of a road lane and along a road surface in a direction of travel 255. The at least one sensor 150 is able detect the presence of debris and road structures 250. Upon detection of a road structure 250, the at least one sensor 150 sends a detection signal 252 to the central computer system 200 indicating the presence of the structure 250 at a particular location on the road surface. Upon receiving the detection signal 252, including location information of the road structure 250, the central computer system 200, selectively commands at least one of the plurality of microwave applicator cells 100A-100D (or microwave generator attached thereto) to cease generating microwaves, based on the received location information of the road structure 250. That is, when the continuously traveling tiled arrangement of microwave applicator cells 100A-D traveling in the direction of travel 255, reaches the road structure 250, the computer system 200 ceases the generation of microwaves by at least one of the attached microwave generators 102C of the microwave cell 100C. Thus, when the microwave application system 1 traverses over the road structure 250, a particular microwave applicator cell 100C (or certain microwave generators 102C attached thereto), ceases microwave treatment. After the microwave applicator cell 100C is determined to be clear of the road structure 250, via continuous travel in the direction of travel 255, the central computer 200 controls the microwave generator 102C of the microwave cell 100C to continue generating microwaves for treating the road surface.

Figure 3:
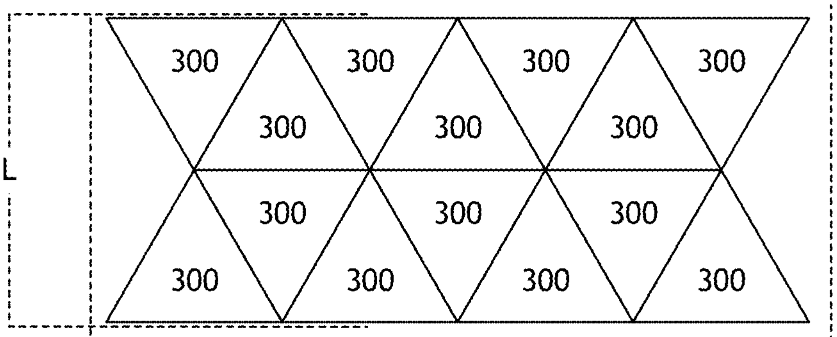
FIG. 3 is an exemplary tessellation of a plurality of triangle-shaped microwave cells in accordance with the present disclosure.
Figure 4:
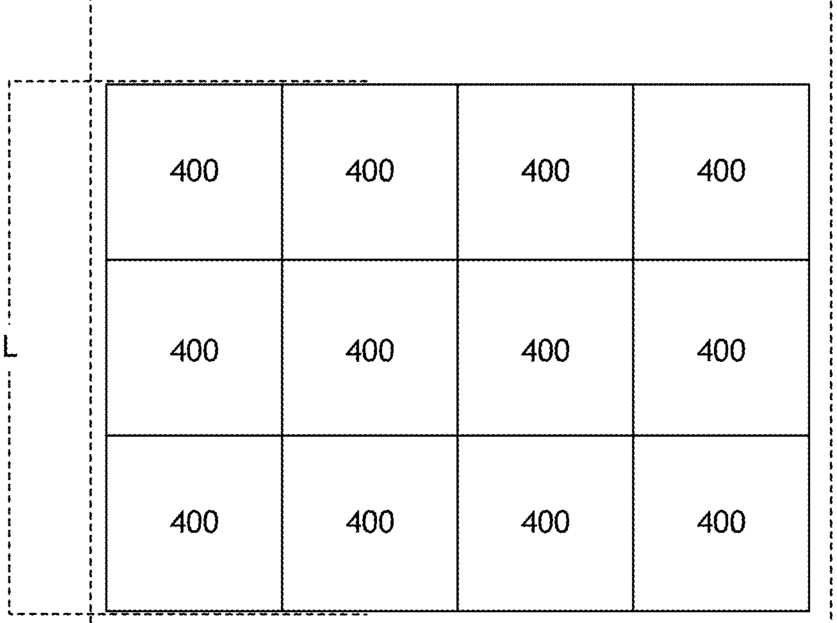
FIG. 4 is an exemplary tessellation of a plurality of quadrilateral-shaped microwave cells in accordance with the present disclosure.
Figure 5:
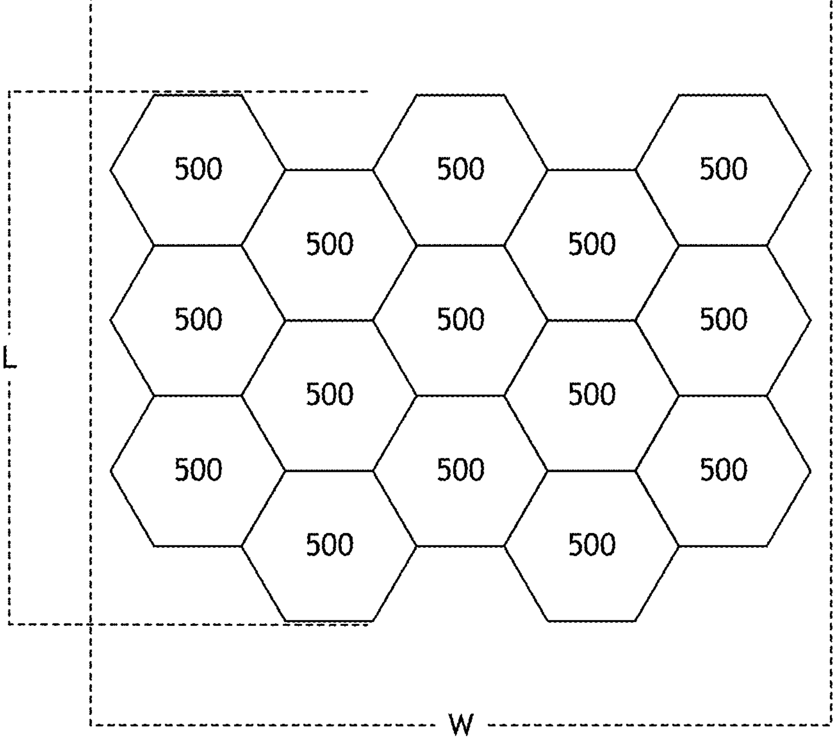
FIG. 5 is an exemplary tessellation of a plurality of hexagon-shaped microwave cells in accordance with the present disclosure.

While FIG. 2 illustrates a single row of tiled microwave cells 100A-D, a microwave system 1 may include multiple rows of tiled microwave applicator cells 100, creating a tessellation of microwave applicator cells 100. FIG. 3 illustrates multiple rows of triangular shaped microwave applicator cells 300. FIG. 4 illustrates multiple rows of quadrilateral shaped microwave applicator cells 400. FIG. 5 illustrates multiple rows of hexagon shaped microwave applicator cells 500. Each arrangement illustrated in FIGS. 3-5 includes a tessellation arrangement that spans a width W. The width W is configured to span across a desired treatment area. That is, microwave applicator cells 100, 300, 400, and 500, may be added or subtracted from the tiled arrangement to compensate for varying widths of road surfaces. For example, an asphalt golf cart path or bike path of about five (5) feet in width would not need as many microwave cells 100, 300, 400, 500, as a standard U.S. Interstate Highway of about 12 feet in width.

In some embodiments and as illustrated in FIGS. 3-5, the tessellation arrangement of the plurality of microwave applicator cells is "monohedral," in that the arrangement consists of only one type of polygonal cell, e.g., triangle 300, square/rectangle 400, or hexagon 500. In each arrangement, the plurality of microwave cells 300, 400, 500 are "edge-to-edge," meaning that corners of the microwave applicator cells always match up with other corners. In other words, the tiled arrangement is a regular tessellation—a pattern made by repeating a regular polygon shapes (triangles, squares, hexagons).

In other embodiments, the tessellation arrangement of the plurality of microwave cells is a semi-regular tessellation—made of two or more regular polygon shapes. For example and without limitation, the tiled arrangement may consist of both triangle shaped microwave applicator cells 300 and hexagon shaped microwave applicator cells 400. In yet still other embodiments, each microwave applicator cell is shaped such that the tiling of cells create a substantially continuous coverage of a treatment area, for example, each microwave applicator cell 100 could be circularly shaped and arranged similarly to the cells 400 or 500 of FIGS. 4 and 5, respectively.

With continued reference to FIGS. 3-5, the plurality of microwave applicator cells 300, 400, 500 are tiled not only in a direction to increase the width W of the tessellation arrangement but also in a direction to increase the length L of the tessellation arrangement. As discussed above, single irradiation systems, such as those in the '234 Patent require the microwave application unit to be temporally fixed in a single repair location making treatment of an entire width of a road time consuming. In order to apply sufficient microwave energy to heat the underlying surface while the microwave system 1 is in continuous motion, a plurality of microwave applicator cells are placed along a length L (in the travel direction 255). Thus, any treatment area of a treatment surface G receives microwave energy from multiple microwave applicator cells traveling over that pavement portion. That is, rather than receiving continuous microwave treatment from a stationary microwave unit, continuous microwave treatment is provided by a train of connected microwave applicator cells traveling over the treatment area. This allows for cost effective treatment of an entire lane, and in some embodiments, may treat about 1000 feet of roadway per minute.

Figure 6:
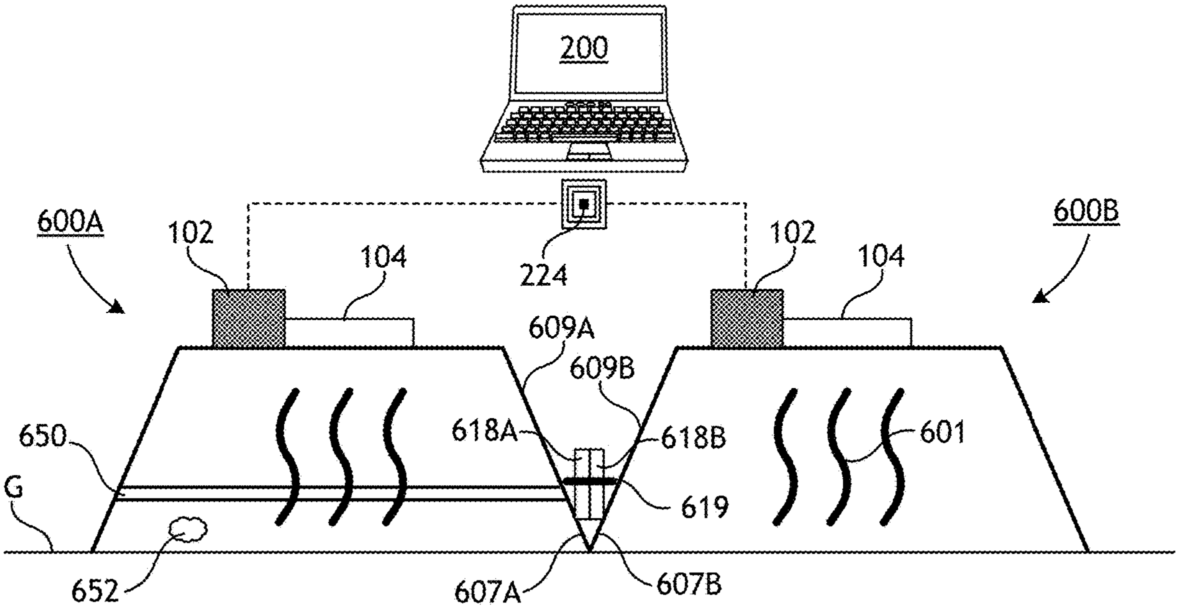
FIG. 6 is a cross-sectional view of two (2) connected microwave cells having abutting angled sidewalls in accordance with the present disclosure.

FIG. 6 illustrates a cross-sectional view of exemplary microwave applicator cells 600A-B with angled/flared sidewall sections 609A-B. That is, each sidewall section 609A, 609B forms an interior angle with the ground that is less than 90 degrees. Each microwave applicator cell 600 A-B includes at least one microwave generator 102 and associated waveguide 104 mounted to a top wall 607. In the illustrated embodiment, each microwave generator 102 and waveguide 104 are positioned such that microwaves 601 radiate from about center portion of each microwave cell 600 A-B. The angled sidewalls 609A-B may direct reflected microwaves 601 to a ground surface G and/or also prevent leakage of microwave energy from the interior of the applicator body. Here, each microwave cell 600A-B is illustrated as having at least one fastening point 618A-B, located along a portion of each sidewall section 609A-B. Again, the location of the fastening point 618 is not limiting, and could be placed anywhere on the applicator body by one skilled in the art to create a removable connection of multiple microwave applicator cells. In a tiled arrangement, a fastener 619 fasteners microwave cells 600A-B together at fastening point 618 urging the bottom edges 607A, 607B of adjacent sidewalls 609A-B, respectively, to contact.

FIG. 6 also illustrates the use of a filter 650 within a microwave cell. The application of microwave energy to the asphalt surface may create an undesirable gas 652 that after some time, may deposit tar material on the interior surfaces of the applicator cell and waveguide 104. Thus, any microwave cell described herein, may be configured to receive a filter 650 located on the interior of the cell and matching an area thereof between the top ceiling 107 and ground G. The filter 650 is transparent or mostly transparent to the microwave radiation 601, i.e., allow the microwave energy to pass through the filer without significant change. The filter 650 is able to trap particulates in the gas 652 that may otherwise build up on the interior surface. The filter 650 may be replaced after accumulation of gas and tar material The efficiency of a microwave application system, such as the microwave application system 1, may be increased by increasing the dielectric loss properties of the treatment material (e.g., asphalt). Generally, "dielectric loss" quantifies a dielectric material's inherent dissipation of electromagnetic energy. Applicants have found that the dielectric constant of asphalt and dielectric loss can be increased by adding moisture to the asphalt. Based on the known dielectric loss of water (approximately 13), the dielectric loss of a water/asphalt aggregate can be increased from the literature value of 0.2 up to a composite value of 5, indicating higher loss. An increase in the value for dielectric loss means that the asphalt layer will be able to absorb a greater percentage of the applied energy. Thus, in some embodiments, the application of moisture to asphalt prior to or during the application of microwave energy may increase the ability for the asphalt later to absorb the applied energy.

Figure 7:
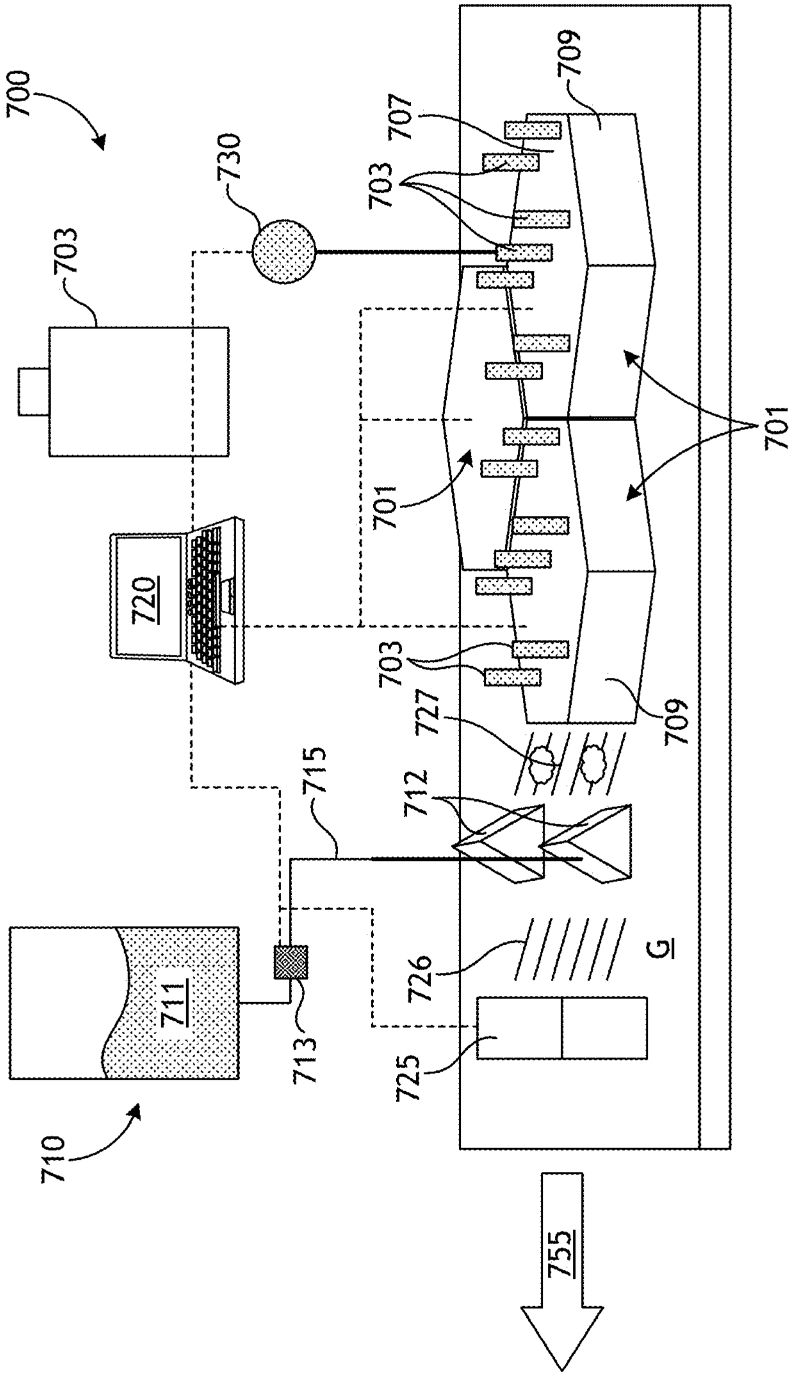
FIG. 7 is another exemplary microwave application system in accordance with the present disclosure.

In some embodiments and with reference to FIG. 7 a microwave application/treatment system 700 includes a plurality of microwave applicator cells 701, similar in some aspects to the microwave applicator cells 100, 300, 400, 500, 600 as discussed above. As illustrated in FIG. 7, each microwave applicator cell 701 includes multiple microwave generator/waveguide pairs 703 mounted through the top of the microwave applicator cell 701 where each is configured to generate and direct microwave energy to the ground G. That is, each microwave applicator cell 701 includes a continuous sidewall 709, a top ceiling 707, and a bottom opening adjacent to the ground G, wherein microwave energy is contained within the sidewall 709 and ceiling 707 and directed into the ground G. Each microwave applicator cell 701 is powered by at least one power source 103 in communication therewith, where microwave generation by the cells is initiated by manual control of a power switch (like switch 105 of FIG. 1). Likewise, the other various components discussed in greater detail below may also be powered by at least one power source 103. In some embodiments, each cell 701 is controllable by a central computer 720 as similarly described with respect to the central computer system 200 of FIGS. 1-6.

The microwave application system 700 may also include an irrigation subsystem 710 configured to apply moisture to the ground (asphalt) G prior to or during application of microwave energy by the plurality microwave applicator cells 701. The irrigation sub-system 710 may be variously embodied to provide a fluid such as water to the ground G. As briefly described above, the addition of water to the ground increases the dielectric loss of the ground G resulting in a more efficient transfer of microwave energy. In the embodiment of FIG. 7, the irrigation subsystem 710 includes a source of moisture 711, e.g., a water tank, and at least one pump 713 configured to transport fluid from the source of moisture 711 to each individual sprayer jet 712 via a plurality of fluid lines 715. It is to be appreciated that while the sprayer jets 712 of the irrigation system 710 are illustrated as being placed directionally in front of the arrangement of the plurality of microwave applicator cells 701, noted by the direction of travel 755 for the system 700, a sprayer jet 712 may be placed within the interior of at least one microwave applicator cell 701. In some embodiments, the pump 713 is controllable by the central computer system 720 enabling the system 700 to selectively control the amount of fluid deposited to the ground G. In embodiments equipped with sensors, such as those described in relation to FIGS. 1 and 2, sensors 150 may determine what spray jets 712 may need activated to apply moisture to the ground. In yet still other embodiments, a power switch, similar to power switch 105 may control the application of power to the irrigation subsystem 710.

In some embodiments, the microwave application system 700 further includes at least one surface treatment device 725 that physically alters the ground G prior to application of moisture by the irrigation subsystem 710 allowing fluid applied by the subsystem 710 to penetrate deeper into the ground. The surface treatment device 725 may be variously embodied but is configured to mechanically cut, drill, scrape, or otherwise create surface defects/channels/cracks 726 (surface modifications) that accept applied fluid. Applied fluid is able to fill the surface modifications and aid in the transfer of microwave energy to the ground G. In some further embodiments, the at least one surface treatment device 725 is a blade system configured to scarify surface modifications 726 into the ground G. Thus, the microwave application system 700 traveling in a direction 755, first creates a rough texture to the ground G, e.g. surface modifications 726, applies a fluid to the textured ground surface, and then treats the fluid enhanced textured ground 727 with microwave energy using a plurality of microwave applicator cells 701.

The amount of microwave energy applied to the ground/asphalt is dependent on the power and arrangement of each microwave generator on the system. The total energy applied is also dependent on the duration of time each microwave applicator cell is allowed to direct microwave energy to the ground. For example, if a microwave application system is configured to raise the temperature of the ground to a certain temperature, e.g., 300 degrees Fahrenheit, a single microwave cell may be placed in a single location with respect to the ground G, until the area covered by the applicator cell reaches the desired temperature. However, since the system 700 includes multiple microwave applicator cells 701, the system may apply microwave energy the ground G while advancing in a direction 755. The speed of the system in the direction of travel 755 for raising the temperature of the material G to a desired temperature is generally based on the number of microwave applicator cells 701 arranged in the direction of travel 755. For example, if a single microwave applicator cell 701 having a length dimension of two feet needs six minutes to heat an area of ground G to a desired temperature, two cells 701 arranged along the direction of travel 755, may continuously apply microwave energy while traveling in the direction of travel 755 by four (4) feet in three (3) minutes. If the application system 701 includes three (3) applicator cells 701 in the direction of travel 755, then the microwave application system 700 may move a total of six (6) feet in two (2) minutes while applying the same amount of microwave energy to the ground to obtain the desired ground temperature. It is to be appreciated that any number of microwave applicator cells 701 may be placed in the direction of travel as to allow the system 700 to move at a faster (desired) speed.

In some embodiments and with continued reference to FIG. 7, the microwave application system 700 includes at least one fan 730 (or equivalent device, e.g., blower, air pump, etc.) configured to provide continuous positive air flow within each waveguide 703. In another embodiment, negative pressure may be used to draw out (evacuate) any accumulating moisture or VOC's generated during the process, that might lessen the effect of the microwave energy or cause material build up on wave guide or chamber surface. The continuous positive or negative air flow prevents fumes generated by the microwave treatment of the asphalt from entering the waveguide 703 providing for safe, clean, and efficient operation of the microwave application system 700.

FIG. 8 illustrates a hexagon-shaped microwave applicator cell 800 for use in an asphalt heating and reprocessing system similar in some aspects to the microwave treatment system 1 of FIG. 1 and system 700 of FIG. 7 and may be best understood with respect thereto. The applicator cell 800 is illustrated as being placed over a layer of asphalt 880 and layer of crushed limestone aggregate 890. The microwave applicator cell 800 includes, metal hexagon body 801 having a diameter D and a height H. In some embodiments, the diameter ranges from about 18 inches to about 26 inches and the height H ranges from about one (1) inch to about twelve (12) inches, as discussed above with respect to FIG. 1. The microwave applicator cell 800 includes seven (7) separate waveguides 804*a-g* uniformly distributed across the top surface 810 of the metal hexagon body. The waveguides 804*a-g* are structures for guiding electromagnetic waves (including microwaves) and are sometimes referred to as waveguide transmission lines. In some exemplary embodiments, the waveguides 804*a-g*, are WR-340 waveguides available from Pasternack.

At the distal end 805 of each waveguide 804*a-g* is a microwave generator 802, (illustrated with respect to waveguide 804*c*) each configured to direct microwaves into its associated waveguide 804*a-g* and into to the asphalt layer 880. In some embodiments, the microwave generators 802 are a 1000 w, 2.45 GHz magnetron source, similar to commercially available microwave oven magnetrons. It is to be appreciated that the wattage of each microwave generator is not limiting and the wattage of each microwave generator may range from about 500 W to about 2000 w. In some embodiments, microwave energy is applied by each microwave generator 802 and waveguide 804 pair to an asphalt layer 880 such that the average temperature of the asphalt layer 880 under the applicator cell 800 is from about 220 degrees Fahrenheit to about 350 degrees Fahrenheit, including about 300 degrees Fahrenheit.

Figure 9:
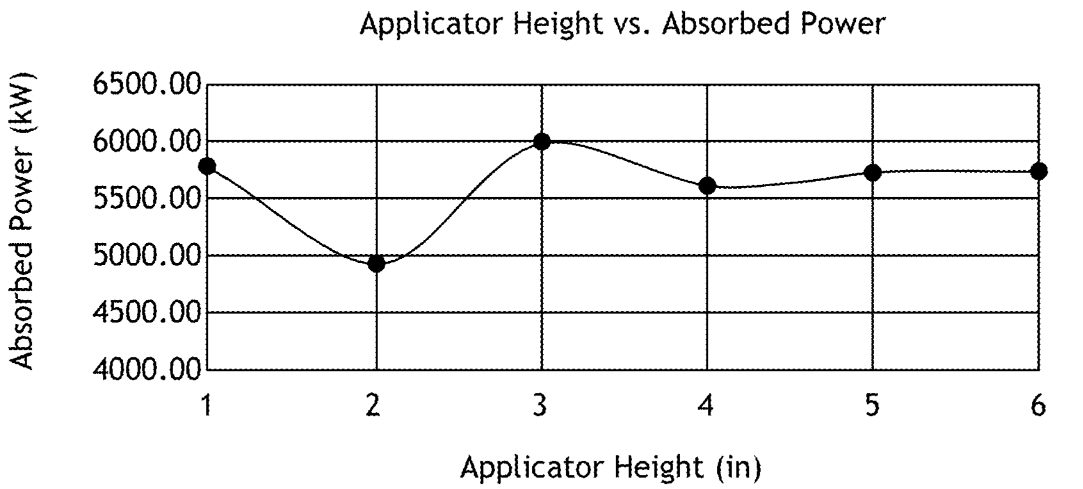
FIG. 9 is a graph illustrating the relationship between applicator height and absorbed power.

Simulations of the microwave applicator cell 800 illustrated in FIG. 8 were performed to determine the effect of application height (H) on the power absorbed by the asphalt 880. FIG. 9 is a graphical display of the applicator height H vs. absorbed power. The results show that from about 1 inch to about 6 inches, the power absorbed by the asphalt 880 ranges from about 5000 w to about 6000 w. In this range, it was found that about 70-86 percent of the power applied by the microwaves is absorbed by the asphalt 880. While an applicator height H of about three (3) inches appears to be optimal for energy absorption, the results of the simulation indicate that the majority of the applied microwave energy will be absorbed by the asphalt layer 880 within this a height range of one (1) to six (6) inches, and that power absorption is relatively stable with an applicator height H of four (4) inches or greater. It is to be appreciated that while simulations were only performed for a range of 1 to 6 inches, other application heights, up to (but not limited to) about 12 inches may also exhibit sufficient power absorption.

Figure 10:
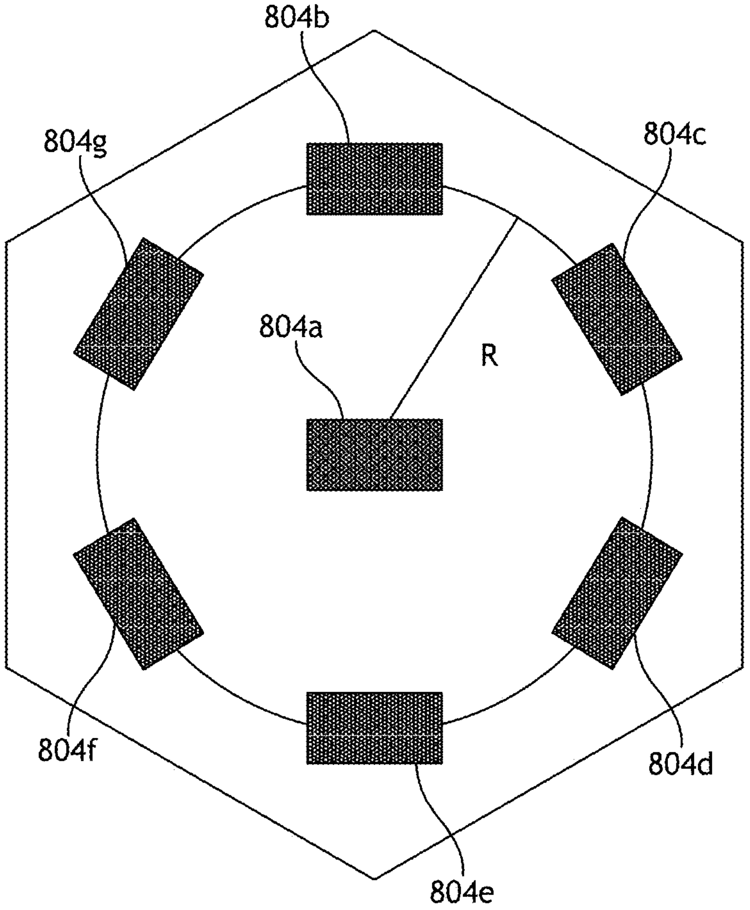
FIG. 10 is an illustration of an arrangement of waveguides on the ceiling of the microwave applicator cell of FIG. 8.
Figure 11:
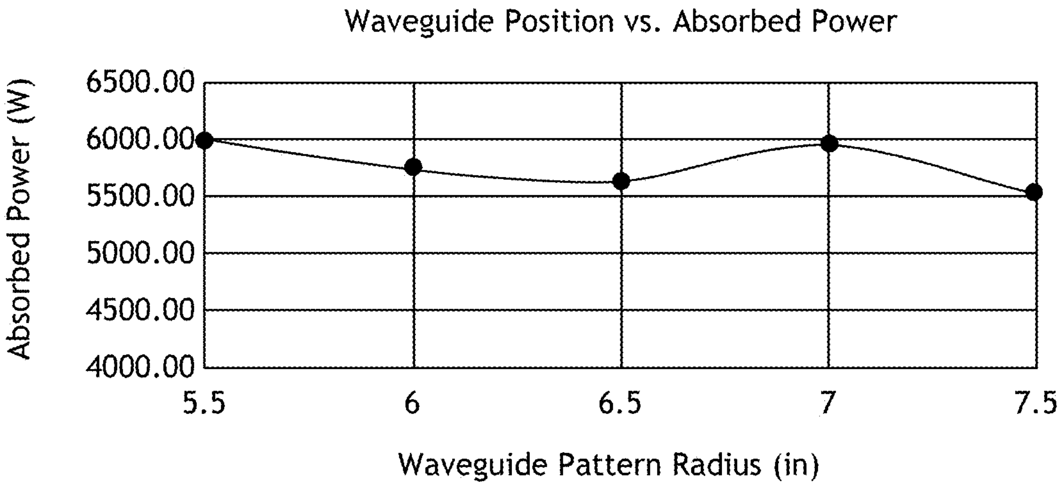
FIG. 11 is a graph illustrating the relationship between the radial placement of waveguides and absorbed power.

In another simulation of the microwave applicator cell 800 of FIG. 8, the spacing of the waveguides 804*b*-*g* were varied around a center of the microwave applicator cell 800. For example and with reference to FIG. 10, a top plan view of the microwave applicator cell 800 of FIG. 8, the waveguides 804*b*-*g* are placed in a spaced apart circular arrangement around a central waveguide 804*a*, wherein each waveguide is located at a radius R, from the center. The radius R may range from about four (4) inches to about eight (8) inches. The simulation performed varied the radius R from about 5.5 inches to about 7.5 inches from the center of the applicator cell 800. The central waveguide 804*a*, remained in the same position. In general power absorption rates in the asphalt were higher when the waveguide spacing was closer, though at a larger radius, e.g., seven (7) inches, the total absorption was increased. The graph of FIG. 11, Waveguide Position vs. Absorbed Power, shows a slightly flat curve indicating that the application design is fairly stable with respect to the waveguide configuration (radius R). That is, all results for R indicated that over 80% of the power is absorbed.

EXAMPLES

The present disclosure is further illustrated in the following non-limiting working examples, it is being understood that these examples are intended to be illustrative only and that the disclosure is not intended to be limited to the materials, conditions, process parameters and the like recited herein.

A simulation was performed in COMSOL Multiphysics of a microwave applicator cell 800 configuration having a diameter D of about 20 inches, a height H of about three (3) inches, and a waveguide pattern radius R of about seven (7) inches.

Figures 12, 13:
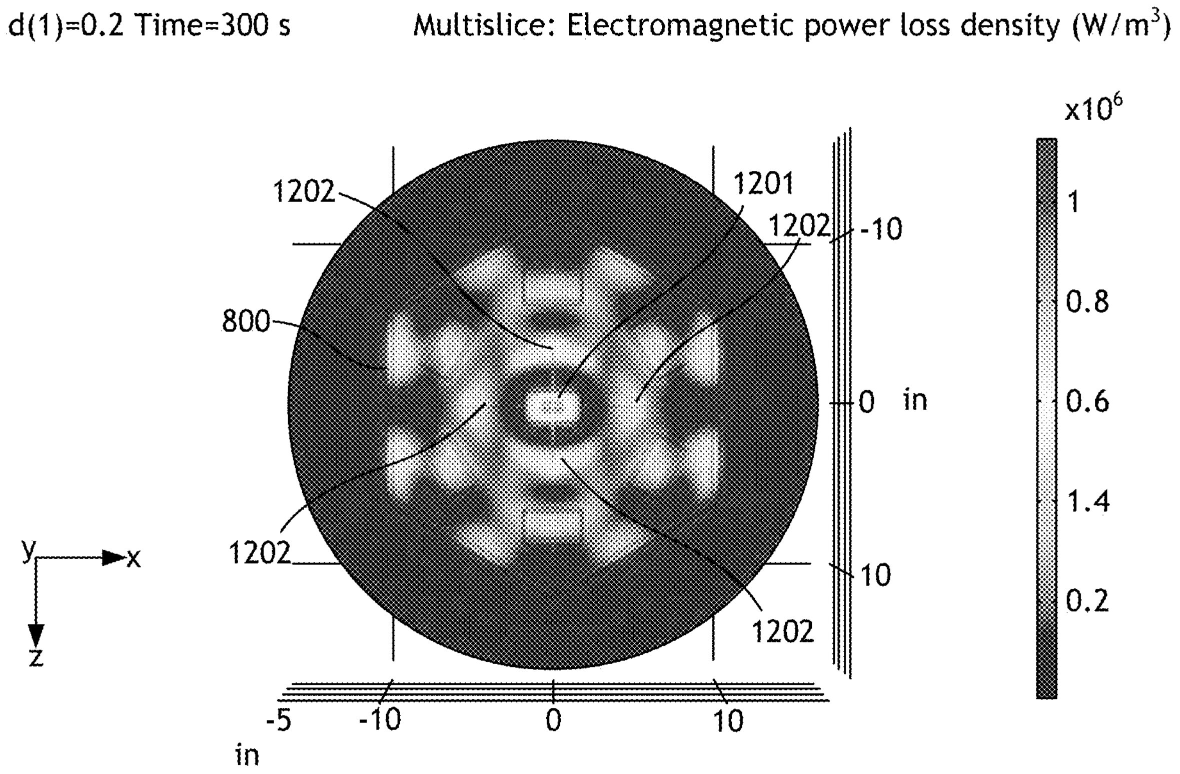
FIG. 12 is a simulation illustration of power density absorbed by asphalt by treatment of the microwave applicator cell of FIG. 8.
FIG. 13 is a table illustrating the relationship between dielectric loss and absorbed power.

FIG. 12 illustrates a top-down view of the power density results for the asphalt 880 and limestone 890 layers. Power density, measured in units of W/m3, is a measure of how much power is absorbed by the material in any given region. This illustration estimates where the regions of the most intense heating within the application layers (asphalt 880 and limestone 890) will occur in the load. As illustrated in FIG. 12 the region of highest power density is directly in the center of the asphalt layer 880 with a heating pattern visible in the area directly beneath the microwave applicator cell 800. The hottest region of the asphalt layer are the direct center 1201 and four (4) side lobes 1202 that appear between the central waveguide 804*a* and outer waveguides 804*b*-*g*.

After about 300 seconds of microwave application, the maximum temperature reached in the asphalt layer is about 276 degrees Fahrenheit. This max. temperature was absorbed in a small center region 1201 and the adjacent side lobes 1202. The surrounding region reached a temperature between about 120 degrees Fahrenheit and 200 degrees Fahrenheit. These results were obtained from modeling the asphalt layer 880 with a dielectric loss of 0.2.

As noted briefly above, the value for dielectric loss for asphalt is strongly influenced by moisture content. Simulation results show an improvement of energy absorption when the asphalt layer was modeled with a dielectric loss higher than 0.2. As a result of an increased dielectric loss, the asphalt layer 880 is able to absorb a greater percentage of the applied energy as indicated in the results of the Table of FIG. 13, which details the total amount of power absorbed by the asphalt 880 and limestone 890 layers as the value of the dielectric loss increases. Additionally, the total amount of power flowing out of the exterior boundaries of the simulation decreased as the asphalt layer's 880 dielectric loss was increased, meaning that less energy was lost to the surrounding atmosphere and to the limestone layer 890. In some embodiments, the power flow to the environment surrounding the asphalt layer 880 is reduced to less than 0.2 percent with a high value for dielectic loss.

Figure 14A:
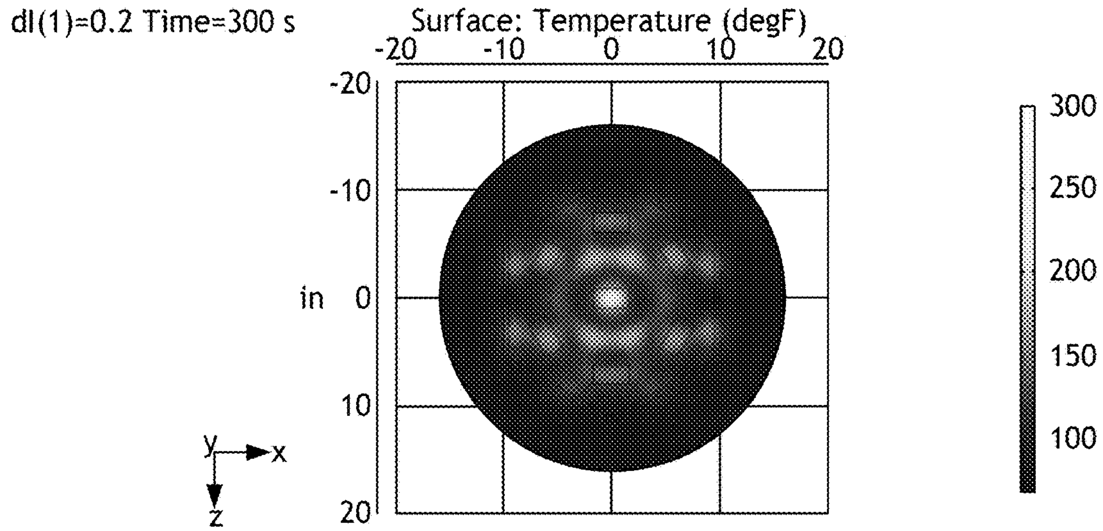
FIGS. 14A-C are simulation illustrations of the absorbed heat by an asphalt layer calculated with a dielectric loss of 0.2, 1, and 5, respectively.
Figure 14B:
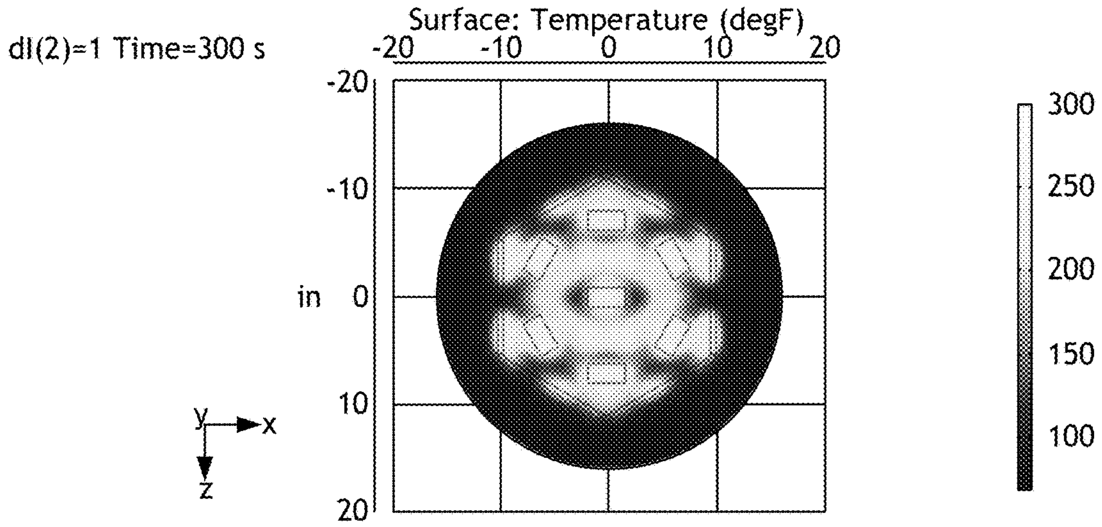
Figure 14C:
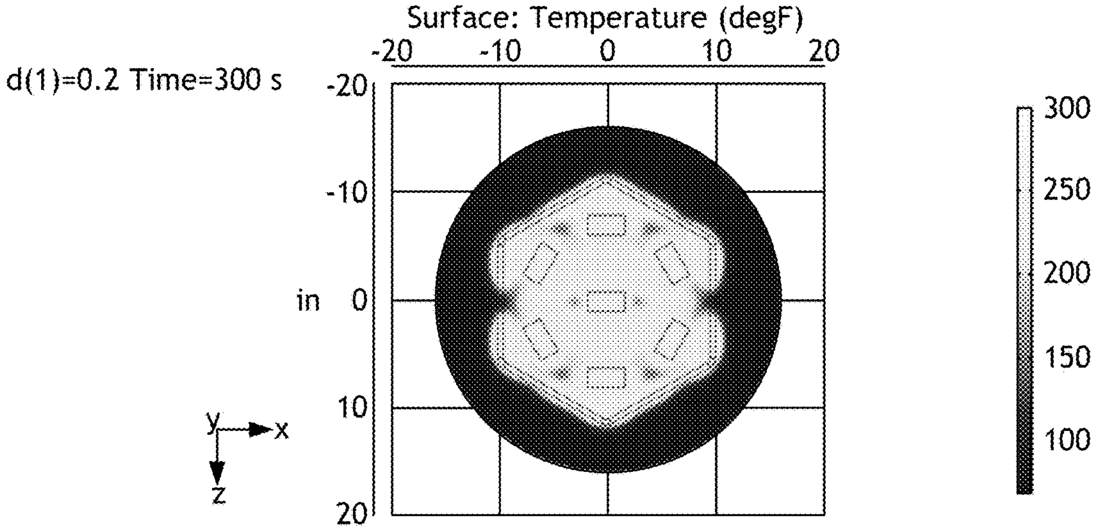

FIGS. 14A-C illustrate surface temperature results after 300 seconds of microwave heating for difference values of dielectric loss. FIG. 14A illustrates surface temperature beneath the hexagon applicator for a dielectric loss value of 0.2 for the asphalt layer 880. FIG. 14B illustrates surface temperature beneath the hexagon applicator 800 for a dielectric loss value of 1.0 for the asphalt layer 880. FIG. 14C illustrates surface temperature beneath the hexagon applicator 800 for a dielectric loss value of 5 for the asphalt layer 880.

Figure 15A:
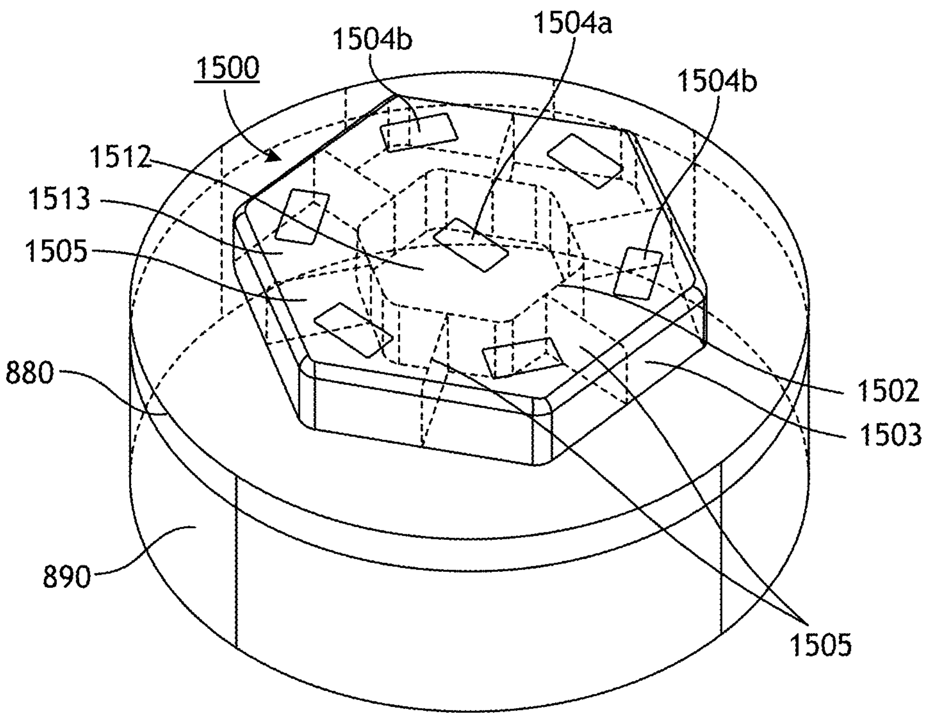
FIG. 15A is a perspective view of another exemplary microwave applicator cell in accordance with the present disclosure.
Figure 15B:
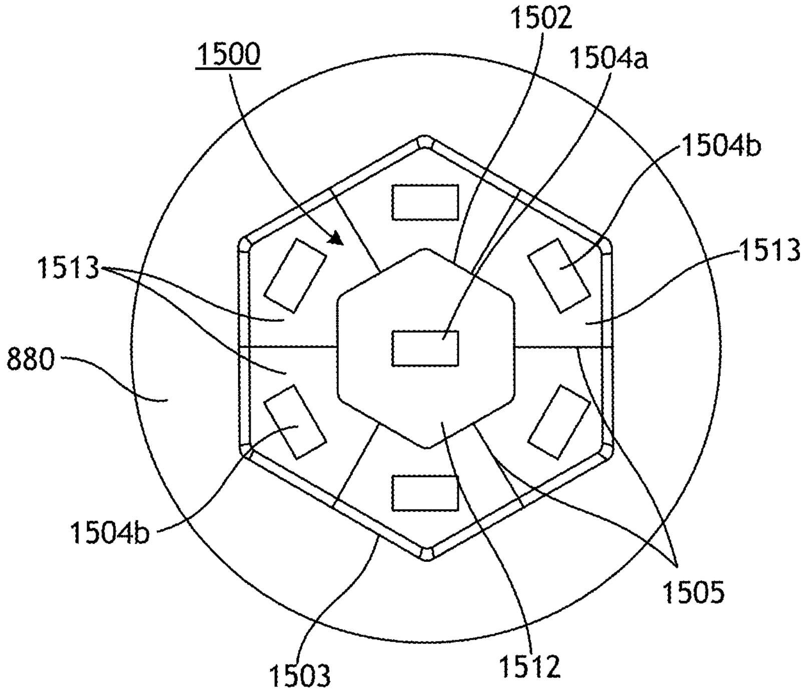
FIG. 15B is a top view of the microwave applicator cell of FIG. 15A.

FIGS. 15A-B illustrate another exemplary embodiment of a microwave cell applicator 1500. As illustrated, the microwave cell applicator 1500 includes an exterior sidewall 1503, defining an interior volume of a microwave applicator cell 1500 and a top wall (illustrated as a transparent top wall in order to illustrate the contents therein) similar to top wall 810 and configured to receive a plurality of microwave wave guides 804 and generator 802 pairs. The illustrated embodiment shows a substantially hexagonal exterior sidewall 1503, i.e., the sidewall forms a hexagon shape as viewed from the top, however, it is to be appreciated that the exterior sidewall shape is not limiting and may be any shape. The microwave applicator cell 1500 also includes an interior sidewall 1502, spaced apart and substantially concentric within the outer sidewall 1503. The interior sidewall 1502 defines a first application chamber 1512 within the interior volume of the microwave applicator cell 1500. In some embodiments, the shape of the interior sidewall 1502 is substantially the same shape as the exterior sidewall 1503. In terms of geometry, the interior sidewall is geometrically similar in shape to the exterior sidewall. In other embodiments, the shape of the interior sidewall 1502 is different from the same shape as the exterior sidewall 1503, e.g. the exterior sidewall 1503 may be a hexagon while the interior sidewall way be a circle, square, triangle, or other shape.

The microwave applicator cell 1500 includes a center positioned waveguide 1504*a*, configured to direct microwave energy to the asphalt layer 880 within the first central chamber 1512 defined within the interior sidewall 1502. A plurality of radial microwave applicators 1504*b* are placed in a spaced apart manner and radially from the center waveguide 1504*a*. These radial microwave applicators 1504*b* are configured to direct microwave energy to the asphalt layer 880 in an area between the interior sidewall 1502 and exterior sidewall 1503.

In some further embodiments and as illustrated in FIGS. 15A and 15B, the microwave applicator cell 1500 includes at least one separating sidewall 1505 that extends between the interior sidewall 1502 to the exterior sidewall 1503. The separating sidewalls 1505 define at least two (2) peripheral chambers 1513 located around the central chamber 1512. The peripheral chambers 1513 are each associated with at least one (1) radial microwave waveguide 1504*b* for application of microwave energy to the asphalt layer 880. In some embodiments, the separating sidewalls 1505 are substantially perpendicular to the interior sidewall 1502 and exterior sidewall 1503. In some embodiments, each peripheral chamber 1513 defined by separating sidewalls have substantially the same area.

In some embodiments, the microwave applicator cell 1500 includes one central application chamber and at least three peripheral cells of equal area. In some further embodiments, and as illustrated in the exemplary embodiment of FIGS. 15A and B, the microwave applicator cell 1500 includes one (1) central application chamber 1512 and at least six (6) peripheral chambers 1513 of equal area wherein each peripheral chamber 1513 is associated with at least one (1) radial waveguide 1504*b*.

The separator walls 1505, like the interior sidewall 1502 and exterior sidewalls 1503 may be made of a metal material. Examples of suitable metal materials include, but are not limited to, stainless steel, steel, aluminum, nickel, brass, and alloys. In some further embodiments, the sidewalls and separator walls are ⅛ inch thick stainless steel plates which are welded seamlessly together to form the applicator cell 1500. In other embodiments, the sidewalls and separator walls are cast of a metal material.

The waveguides 1504*a* and 1504*b* may be placed anywhere within an associated chamber 1512, 1513. However, in some embodiments, each waveguide 1504*a*, 1504*b* is placed such that each feed is centralized in relation to its associated chamber. As microwaves generated by the microwave generators and transmitted through the waveguides 1504*a,b* do not pass through metal (such as the separator walls and sidewalls), the multi-chamber microwave applicator cell may reduce destructive interference between the microwaves as they exit the waveguide feed and enter the interior volume of the microwave applicator cell therefore increasing the amount of energy absorbed. The inclusion of the separator walls also reduces the likelihood of electrical arcing within the applicator volume.

Figure 16:
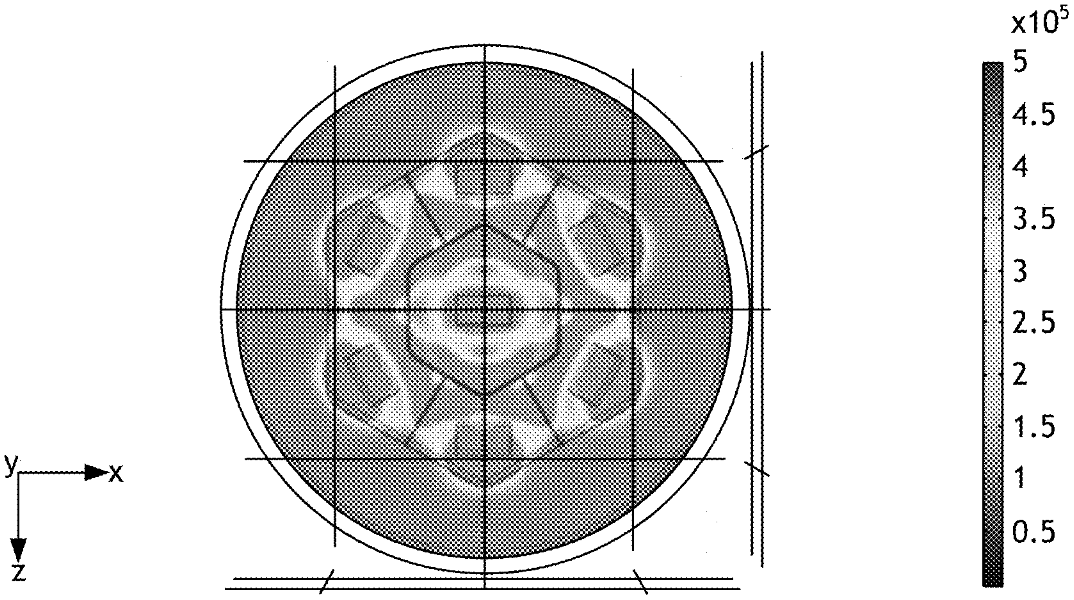
FIG. 16 is simulation illustration of power density absorbed by asphalt by treatment of the microwave applicator cell of FIG. 15A.

FIG. 16 illustrates the power density simulation corresponding to areas where microwave energy is absorbed by the asphalt with a microwave applicator cell having a plurality of chambers, such as microwave applicator cell 1500 and chambers 1512 and 1513.

In accordance with one aspect of the present disclosure, a microwave applicator cell for providing microwave energy to a treatment surface is described. The microwave applicator cell includes an applicator body having an exterior sidewall and top wall and at least two microwave generator and waveguide pairs. Each waveguide of the microwave generator and waveguide pairs has a first end operatively connected to an associated microwave generator and a second end mounted to the top wall arranged to direct microwaves from the microwave generator to the treatment surface bounded by the applicator body. In a further embodiment, the generated microwaves have a frequency of 2.45 GHz. In another further embodiment, the exterior sidewall comprises a plurality of adjacent polygonal perimeter sections connected together to create a regular polygon shape. In another further embodiment, the applicator body is in the shape of a regular polygon as viewed from the top. In another further embodiment, one microwave generator and waveguide pair is a central microwave generator and central waveguide pair, the central waveguide is mounted to a center point of the top wall. In another further embodiment, the microwave applicator cell includes at least three spaced apart radial microwave generator and radial waveguide pairs, each mounted to the top wall and spaced apart from the central microwave generator and waveguide pair by a radius. In another further embodiment, the radius ranges from about four (4) inches to about eight (8) inches. In another further embodiment, the applicator body has a diameter from about 18 inches to about 26 inches. In another further embodiment, the applicator body has a height from about one (1) inch to about seven (7) inches. In another further embodiment, the microwave applicator cell further includes an interior sidewall spaced apart and substantially concentric with the exterior sidewall, the interior sidewall defining a central chamber, wherein at least one microwave generator and waveguide pair is configured to direct microwave energy into the central chamber toward the treatment surface. In another further embodiment, at least one microwave generator and waveguide pair is mounted such that the waveguide directs microwave energy to the treatment surface between the interior sidewall and exterior sidewall. In another further embodiment, the microwave applicator cell further includes a plurality of spaced apart separating sidewalls. Each separating sidewall extends perpendicularly from the interior sidewall to the exterior sidewall and defining at least two equally dimensioned peripheral chambers, wherein at least one (1) microwave generator and waveguide pair is configured to direct microwave energy into an associated peripheral chamber and toward the treatment surface. In another further embodiment, the interior sidewall is geometrically similar in shape to the exterior sidewall.

In accordance with another aspect of the present disclosure, a microwave application system for continuous treatment of a treatment surface is described. The microwave application system includes a plurality of microwave applicator cells for providing microwave energy to a treatment surface. Each microwave applicator cell includes an applicator body including an exterior sidewall a top wall and at least one microwave generator and waveguide pair, wherein the waveguide of the microwave generator and waveguide pair has a first end operatively connected to an associated microwave generator and a second end mounted to the top wall arranged to direct microwaves from the microwave generator to the treatment surface bounded by the applicator body. The system also includes a power source configured to supply power to the at least one microwave generator. In a further embodiment, the plurality of microwave applicator cells are arranged in a tessellation, the tessellation having a width and a length. In a further embodiment, the width of the tessellation of microwave applicator cells is about the width of a single lane road. In a further embodiment, the system further includes a central computer system in communication with the power source and each microwave applicator cell in the plurality of microwave applicator cells configured to control the generation of microwaves by the at least one microwave generator. In a further embodiment, the system further includes at least one sensor configured to detect a condition of a road surface. In a further embodiment, the at least one sensor is in communication with a central computer system, wherein the central computer system generates location data based on a sensor data of a present road condition and selectively operates a corresponding microwave applicator cell based on the location data. In a further embodiment, the system further includes an irrigation subsystem, including a fluid source and at least one spray jet configured to apply a fluid to the treatment surface prior to application of microwaves by the plurality microwave applicator cells. In a further embodiment, the system further includes at least one surface treatment device configured to physically alter the treatment surface prior to the application of microwaves by the plurality microwave applicator cells.

In accordance with another aspect of the present disclosure, a method for microwave treating a treatment surface is described. The method includes continuously advancing a plurality of microwave applicator cells, each microwave applicator cell comprising an applicator body including a sidewall a top wall and at least one microwave generator and waveguide pair, wherein the waveguide of the microwave generator and waveguide pair has a first end operatively connected to an associated microwave generator and a second end mounted to the top wall arranged to direct microwaves from the microwave generator to the treatment surface bounded by the applicator body. The method also includes applying microwaves to the treatment surface as the plurality of microwave applicator cells are continuously advancing. In a further embodiment, the method further includes spraying a fluid to the treatment surface prior to applying microwaves. In another further embodiment, the method includes mechanically modifying the treatment surface with a surface treatment device prior to spraying a fluid to the treatment surface, the surface modifications receiving the fluid prior to applying microwaves.

Although specific terms are used in the above description, for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

As used herein, the terms "generally" and "substantially" are intended to encompass structural or numerical modifications which do not significantly affect the purpose of the element or number modified by such term.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A microwave applicator cell for providing microwave energy to a treatment surface comprising:

an applicator body including an exterior sidewall, top wall, and an interior sidewall spaced apart and substantially concentric with the exterior sidewall, the interior sidewall defining a central chamber;

at least two microwave generator and waveguide pairs;

each waveguide of the microwave generator and waveguide pair having a first end operatively connected to an associated microwave generator and a second end mounted to the top wall arranged to direct microwaves from the microwave generator to the treatment surface bounded by the applicator body, and wherein at least one microwave generator and waveguide pair is configured to direct microwave energy into the central chamber toward the treatment surface.

2. The microwave applicator cell according to claim 1, wherein the generated microwaves have a frequency of 2.45 GHz.

3. The microwave applicator cell according to claim 1, wherein the exterior sidewall comprises a plurality of adjacent polygonal perimeter sections connected together to create a regular polygon shape.

4. The microwave applicator cell according to claim 1, wherein the applicator body is in the shape of a regular polygon as viewed from the top.

5. The microwave applicator cell according to claim 1, wherein one microwave generator and waveguide pair is a central microwave generator and central waveguide pair, the central waveguide is mounted to a center point of the top wall.

6. The microwave applicator cell according to claim 5, further comprising at least three spaced apart radial microwave generator and radial wave guide pairs, each mounted to the top wall and spaced apart from the central microwave generator and waveguide pair by a radius.

7. The microwave applicator cell according to claim 6, wherein the radius ranges from about 4 inches to about 8 inches.

8. The microwave applicator cell according to claim 1, wherein the applicator body has a width from about 18 inches to about 26 inches.

9. The microwave applicator cell according to claim 1, wherein the applicator body has a height from about 1 inch to about 12 inches.

10. The microwave applicator cell according to claim 1, wherein the interior sidewall is geometrically similar in shape to the exterior sidewall.

11. The microwave applicator cell according to claim 1, wherein at least one microwave generator and waveguide pair is mounted such that the waveguide directs microwave energy to the treatment surface between the interior sidewall and exterior sidewall.

12. The microwave applicator cell according to claim 1, further comprising plurality of spaced apart separating sidewalls, each extending perpendicularly from the interior sidewall to the exterior sidewall and defining at least two equally dimensioned peripheral chambers, wherein at least one microwave generator and waveguide pair is configured to direct microwave energy into an associated peripheral chamber and toward the treatment surface.

13. A microwave application system for continuous treatment of a treatment surface comprising:

a plurality of microwave applicator cells for providing microwave energy to a treatment surface comprising an applicator body and at least one microwave generator and waveguide pair, wherein the applicator body comprises an exterior sidewall, a top wall, and an interior sidewall spaced apart and substantially concentric with the exterior sidewall, the interior sidewall defining a central chamber, wherein the waveguide of the microwave generator and waveguide pair has a first end operatively connected to an associated microwave generator and a second end mounted to the top wall arranged to direct microwaves from the microwave generator to the treatment surface bounded by the applicator body, and wherein at least one microwave generator and waveguide pair is configured to direct microwave energy into the central chamber toward the treatment surface;

a power source configured to supply power to the at least one microwave generator.

14. The microwave application system according to claim 13, wherein the plurality of microwave applicator cells are arranged in a tessellation, the tessellation having a width and a length.

15. The microwave application system according to claim 14, wherein the width of the tessellation of microwave applicator cells is about the width of a single lane road.

16. The microwave application system according to claim 13, further comprising a central computer system in communication with the power source and each microwave applicator cell in the plurality of microwave applicator cells configured to control the generation of microwaves by the at least one microwave generator.

17. The microwave application system according to claim 13 further comprising at least one sensor configured to detect a condition of a road surface.

18. The microwave application system according to claim 17, wherein the at least one sensor is in communication with a central computer system, wherein the central computer system generates location data based on a sensor data of a present road condition and selectively operates a corresponding microwave applicator cell based on the location data.

19. The microwave application system according to claim 13 further comprising an irrigation sub-system, including a fluid source and at least one spray jet configured to apply a fluid to the treatment surface prior to application of microwaves by the plurality microwave applicator cells.

20. The microwave application system according to claim 13, further comprising at least one surface treatment device configured to physically alter the treatment surface prior to the application of microwaves by the plurality microwave applicator cells.

21. A method for microwave treating a treatment surface comprising:

continuously advancing a plurality of microwave applicator cells, each microwave applicator cell comprising an applicator body and at least one microwave generator and waveguide pair, wherein the applicator body comprises an exterior sidewall, a top wall, and an interior sidewall spaced apart and substantially concentric with the exterior sidewall, the interior sidewall defining a central chamber, wherein the waveguide of the microwave generator and waveguide pair has a first end operatively connected to an associated microwave generator and a second end mounted to the top wall arranged to direct microwaves from the microwave generator to the treatment surface bounded by the applicator body, and wherein at least one microwave generator and waveguide pair is configured to direct microwave energy into the central chamber toward the treatment surface;

applying microwaves to the treatment surface as the plurality of microwave applicator cells are continuously advancing.

22. The method for microwave treating a treatment surface according to claim 21 further comprising, spraying a fluid to the treatment surface prior to applying microwaves.

23. The method for microwave treating a treatment surface according to claim 22 further comprising surface modification of the treatment surface with a surface treatment device prior to spraying a fluid to the treatment surface, the surface modifications receiving the fluid prior to applying microwaves.

* * * * *